(No Model.) 8 Sheets—Sheet 1.

E. A. CALAHAN & P. B. DELANY.
MULTIPLEX TELEGRAPH.

No. 281,339. Patented July 17, 1883.

Fig. 1.
Station 1.

Witnesses
Chas H Smith
J. Hail

Inventors
E. A. Calahan
P. B. Delany
per Lemuel W. Serrell
atty

N. PETERS, Photo-Lithographer, Washington, D. C.

(No Model.) 8 Sheets—Sheet 3.

E. A. CALAHAN & P. B. DELANY.
MULTIPLEX TELEGRAPH.

No. 281,339. Patented July 17, 1883.

Fig. 3.

Station 1.

Witnesses
Chas. H. Smith
J. Hait

Inventors
E. A. Calahan
P. B. Delany
per Lemuel W. Serrell atty

N. PETERS, Photo-Lithographer, Washington, D. C.

(No Model.) 8 Sheets—Sheet 5.

E. A. CALAHAN & P. B. DELANY.
MULTIPLEX TELEGRAPH.

No. 281,339. Patented July 17, 1883.

Fig. 5.

Witnesses
Chas. H. Smith
J. Haib

Inventors
E. A. Calahan
P. B. Delany
per Lemuel W. Serrell
atty (No Model.) 8 Sheets—Sheet 6.

E. A. CALAHAN & P. B. DELANY.
MULTIPLEX TELEGRAPH.

No. 281,339. Patented July 17, 1883.

Fig. 6.
Station 1.

Fig. 7.
Station 2.

Witnesses
Chas. H. Smith
J. Haib

Inventors
E. A. Calahan
P. B. Delany
per Lemuel W. Serrell
atty (No Model.) 8 Sheets—Sheet 7.

E. A. CALAHAN & P. B. DELANY.
MULTIPLEX TELEGRAPH.

No. 281,339. Patented July 17, 1883.

Fig. 8.
Station 1.

Fig. 9.
Station 2.

Witnesses
Chas H Smith
J Haib

Inventors
E. A. Calahan
P. B. Delany
per Lemuel W. Serrell
atty

N. PETERS, Photo-Lithographer, Washington, D. C.

(No Model.) 8 Sheets—Sheet 8.

E. A. CALAHAN & P. B. DELANY.
MULTIPLEX TELEGRAPH.

No. 281,339. Patented July 17, 1883.

Witnesses
Chas. H. Smith
J. Hail

Inventors
E. A. Calahan
P. B. Delany
per Lemuel W. Serrell
atty

N. PETERS, Photo-Lithographer, Washington, D.C.

UNITED STATES PATENT OFFICE.

EDWARD A. CALAHAN, OF BROOKLYN, AND PATRICK B. DELANY, OF NEW YORK, N. Y., ASSIGNORS TO THE STANDARD ELECTRIC MANUFACTURING COMPANY.

MULTIPLEX TELEGRAPH.

SPECIFICATION forming part of Letters Patent No. 281,339, dated July 17, 1883.

Application filed November 14, 1882. (No model.)

*To all whom it may concern:*

Be it known that we, EDWARD A. CALAHAN, of Brooklyn, in the county of Kings and State of New York, and PATRICK B. DELANY, of the city and State of New York, have invented an Improvement in Multiplex Telegraphs, of which the following is a specification.

Tuning-forks have been made use of in the maintenance of synchronous movements and vibrations in electric telegraphs, and a rotator with a circuit-closing spring has been employed in telegraphy, as by reference to Letters Patent No. 203,423, granted to Paul La Cour, will more fully appear.

In our improvements we employ two rotary progressive circuit-closers, one at each end of the line. These are rotated with an absolutely uniform movement, and the progressive circuit-closers hence coincide constantly with the corresponding contact-blocks at both ends of the line. With these contact-blocks circuit-closing and reversing keys are connected, and polarized relays and sounders or other suitable transmitting and receiving instruments. The contact-blocks are connected up into groups, and each group is independent of the other, and, with the transmitting and receiving instruments belonging to that group, forms a complete telegraph. There may be two, four, six, eight, or more groups of contact-blocks and their corresponding instruments at each end of the line, and these instruments are not in any manner dependent upon any other transmitting or receiving instrument. The synchronous progressive circuit-closers apply the line-wire successively to these transmitting and receiving instruments, and these progressive circuit-closers are revolved so rapidly to the successive sets of transmitting and receiving instruments that each one can be operated in the same manner as a single Morse system. For instance, suppose each revolving progressive circuit-closer has sixty contact-points, and that twelve of these contact-points are devoted to the maintenance of synchronism, and the remaining forty-eight segments are divided up into four groups of twelve segments each, the circuit-closer, revolving one hundred and seventy times per minute, gives ten thousand and two hundred pulsations per minute, two thousand and forty for synchronous or adjusting purposes, and eight thousand one hundred and sixty pulsations for telegraph purposes, which, divided among four (4) operators and circuits, gives each operator two thousand and forty contacts with the line per minute, or thirty-four per second. These contacts, if again divided up among eight (8) operators, each operator would get seventeen (17) contacts with the line per second, which would be quite sufficient for the transmission of Morse characters of a high rate of speed. Each operator can receive or send as clearly and independently of the other operators as he would if he alone were using the line, because so long as the progressive circuit-closers operate in perfect harmony the line is apportioned to each operator in succession and then given to the next operator, and this is done so rapidly that none of the signals are lost. By employing polarized relays there will be no false vibrations in consequence of the rapid make and break, because the relays do not respond to pulsations, but to change of polarity.

In addition to the reference heretofore made to the patent of Paul La Cour, we have represented in the drawings the general features of the apparatus for producing the synchronous or isochronous rotation of the progressive circuit-closers at the two ends of the line.

In the drawings, In Fig. 10 we have represented a plan partially broken open, and in Fig. 11 an elevation of the revolving circuit-closer similar to that set forth in the said La Cour patent.

Figure 10:
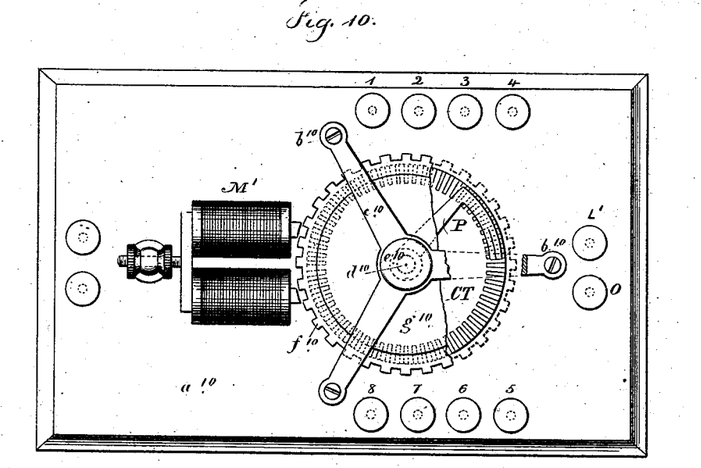
Figure 11:
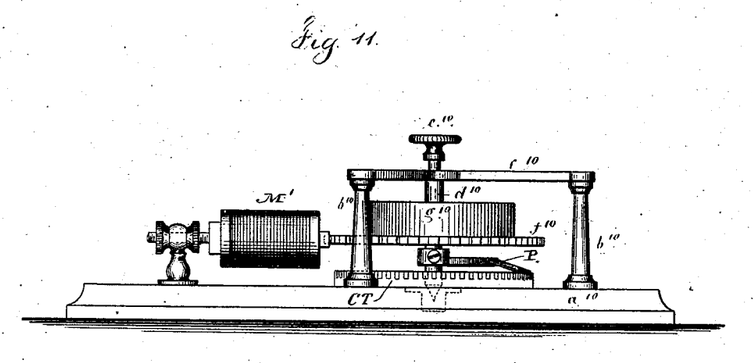

The base $a^{10}$ supports the columns $b^{10}$ and frame $c^{10}$, and there is a vertical shaft, $d^{10}$, pivoted at the bottom in a step within the circuit-table C T and passing through the frame $c^{10}$, and there is a button or head, $e^{10}$, at the upper end of this shaft $d^{10}$. The armature-wheel $f^{10}$ is upon the shaft $d^{10}$, and there are projecting blocks or teeth around its edge. This wheel is of iron. The box $g^{10}$, above the wheel $f^{10}$, is hollow and about half full of mercury. The circuit-closing arm P, with contact-spring at its end, is upon the shaft $d^{10}$ and revolves with it. The end of the contact-spring rubs over the contact-plates in the circuit-table C T. These plates are insulated from each other, and the circuit-wires are connected to such plates, so as to form groups, as hereinafter indicated. There are half the number of teeth or projections on the armature-wheel $f^{10}$ that there are contact blocks or plates in C T, and the electro-magnet M' has its poles adjacent to the edge of the armature-wheel $f^{10}$. If an electric current is pulsated in the magnet M' by means of a vibrating reed or tuning-fork and a local circuit-breaker, the magnet M' will act as a motor to rotate the armature-wheel $f^{10}$ and circuit-closer P, it being understood that the speed of rotation will be in proportion to the rapidity of the pulsations in M', the blocks on the armature-wheel being attracted by the magnetism, and then passing on by the momentum as the circuit is broken, and the next blocks being attracted by the poles of the magnet when next energized. Presuming that one of these motors and circuit-closers is at each station, and that one is kept in rotation by a tuning-fork and local circuit-breaker, the similar instrument at the other end of the line is started by the operator, who gives it a whirl, and it is kept in rotation synchronously by pulsations on the line, as hereinafter described, acting in its magnet M'.

Figure 1:
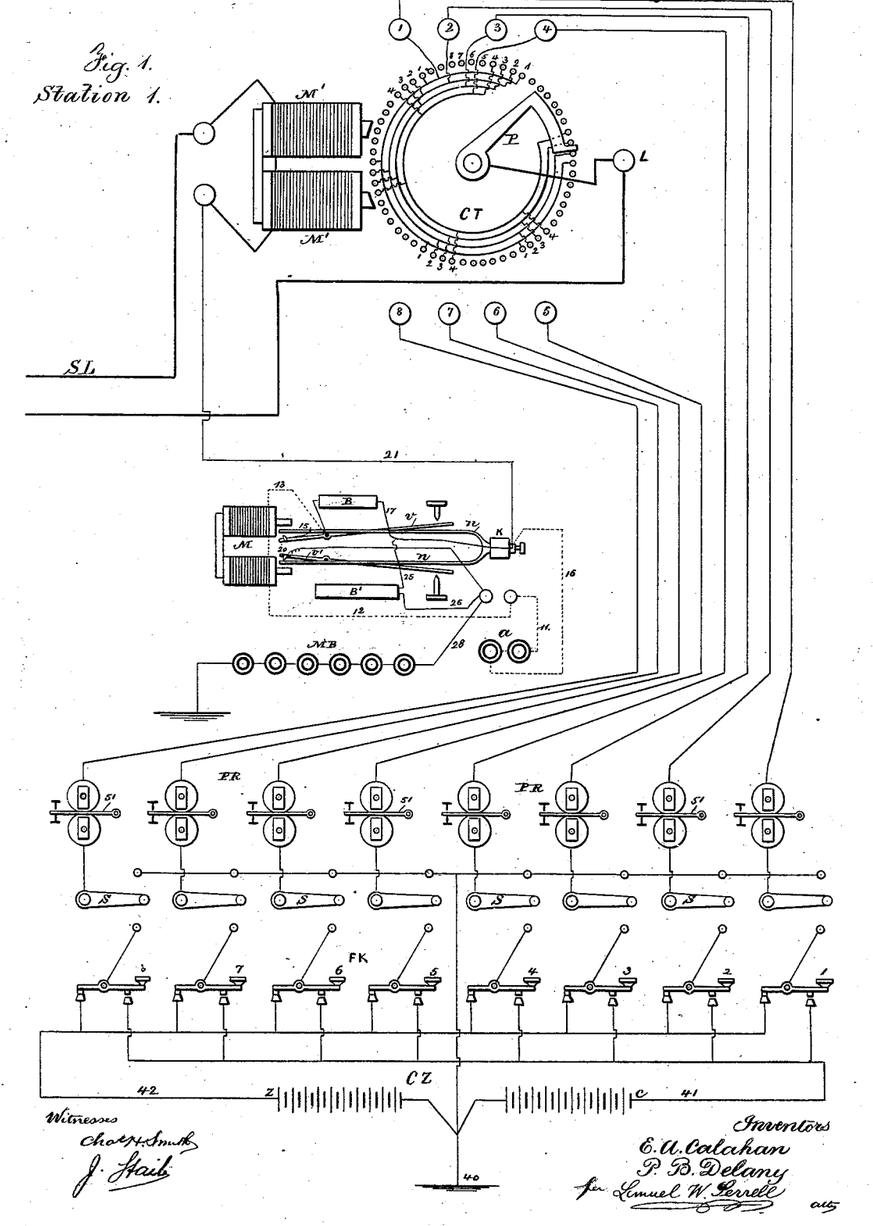
Figures 1 and 2 represent terminal stations, with two line-wires extending from one station to the other. One line-wire is employed to keep the instruments running synchronously. The other line-wire is for the transmission of messages.

Referring to Fig. 1, it will be apparent that at the transmitting end the fork $n$ is kept in vibration by the magnet M and local battery $a$, the current passing by the wires 11 and 12 to M, through 13, spring-lever $v$ to 15, thence by fork $n$ to K, and by 16 to $a$. (See La Cour's patent.)

At B there is a resistance in the shunt-circuit 17 between 15 and K, to lessen the spark between the point 15 and fork $n$. The other prong of the fork $n$ pulsates the current through the magnet M' M', to set into rotation a wheel having one-half the number of teeth there are divisions in the circuit-table C T of the progressive circuit-closer.

The construction and operation of these rotating devices are shown in the said patent of La Cour by Figs. 3, 4, and 5, and need not be further referred to.

Figure 2:
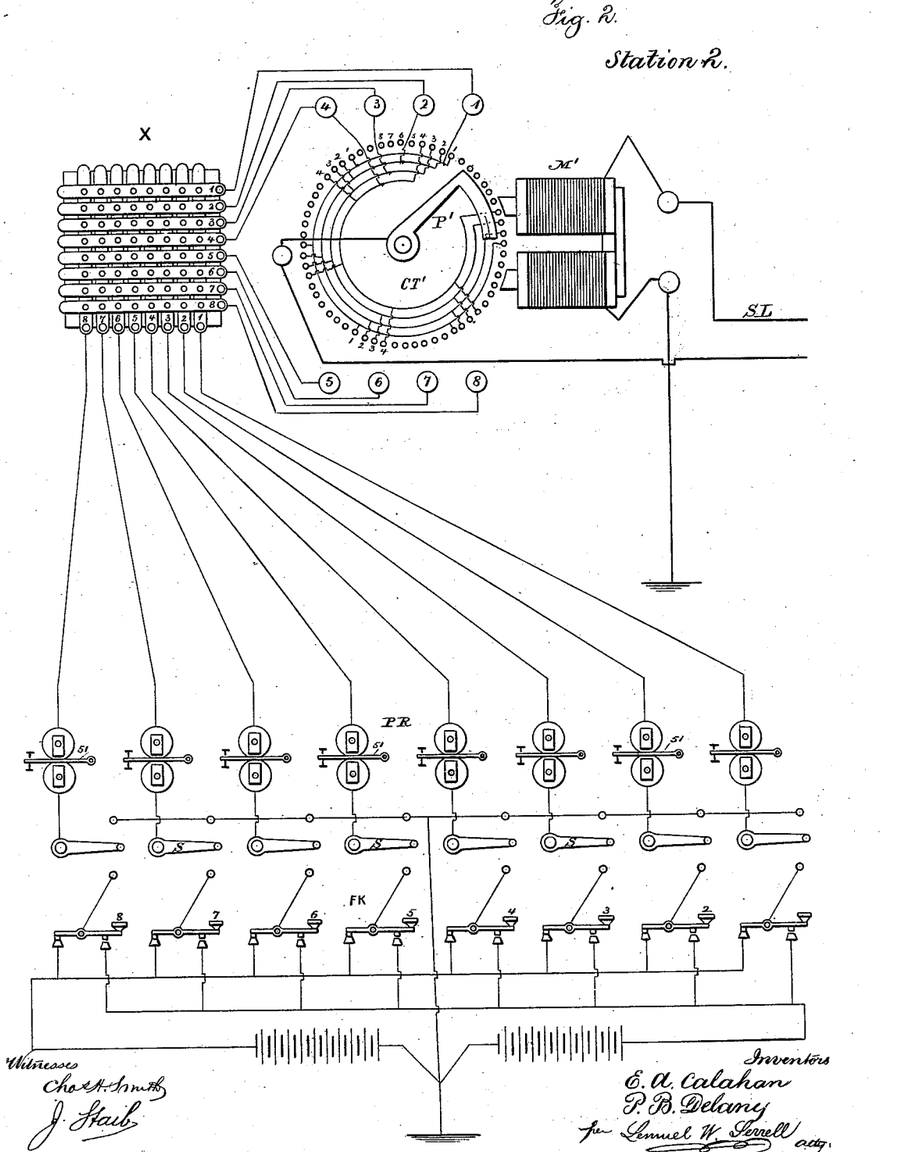

The point 20 on the lever $v'$ forms, with the fork $n$, the circuit-breaker, and the current passes from the motor-battery M B by 28 20 $n$ $k$ 21 to M' M'. The resistance B' and shunt-connections 25 26 lessen the spark at 20. The current passes from M', station 1, Fig. 1, by a second line-wire, S L, to the magnet M' at station 2, Fig. 2, and thence to the ground, and in so doing the rotating devices are set in motion and turn the circuit-closing arm P' synchronously with the arm P.

Figure 6:
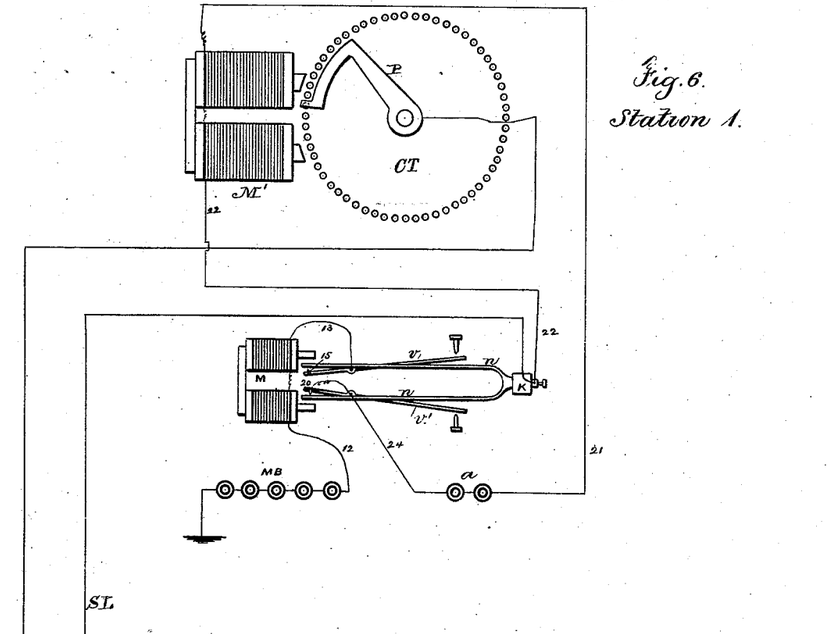
Figs. 6 and 7 represent forks and their actuating-magnets in the line-circuit, and a local circuit, operated by the tuning-fork, to each motor-magnet.
Figure 7:
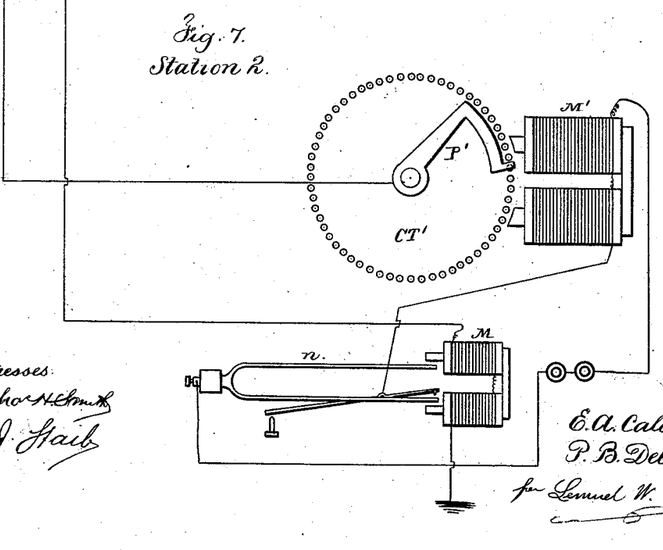

We sometimes place the helices M of two forks in the circuit of the secondary line S L, with ground-connections, and pulsate the current by the action of the tuning-fork $n$. (See Figs. 6 and 7.) In this case the battery M B is connected with the main line through 12 M 13 $v$ 15 $n$ to S L, thence to distant station through M to ground, so that the forks at the two stations vibrate synchronously, and in so doing they pulsate at 20, the local circuit from $a$ by 24 20 $n$ 22 to M', thence by 21 back to $a$. In both these instances the circuit-closer arms P and P' are rotated in harmony over the circuit-tables C T and C T'. We now presume that the motor-magnets M' M' revolve the aforesaid toothed wheel, and with it the progressive circuit-closer P, which is upon the same arbor as said toothed wheel. The number of revolutions per minute will be determined by the pulsations of the tuning-fork and by the number of teeth in the revolving wheel. Say, for example, there are thirty teeth in the actuating-wheel, and that the rate of vibration of the tuning-fork is five thousand one hundred per minute, about eighty-five per second, the circuit-closer P would revolve one hundred and seventy times a minute.

Figure 3:
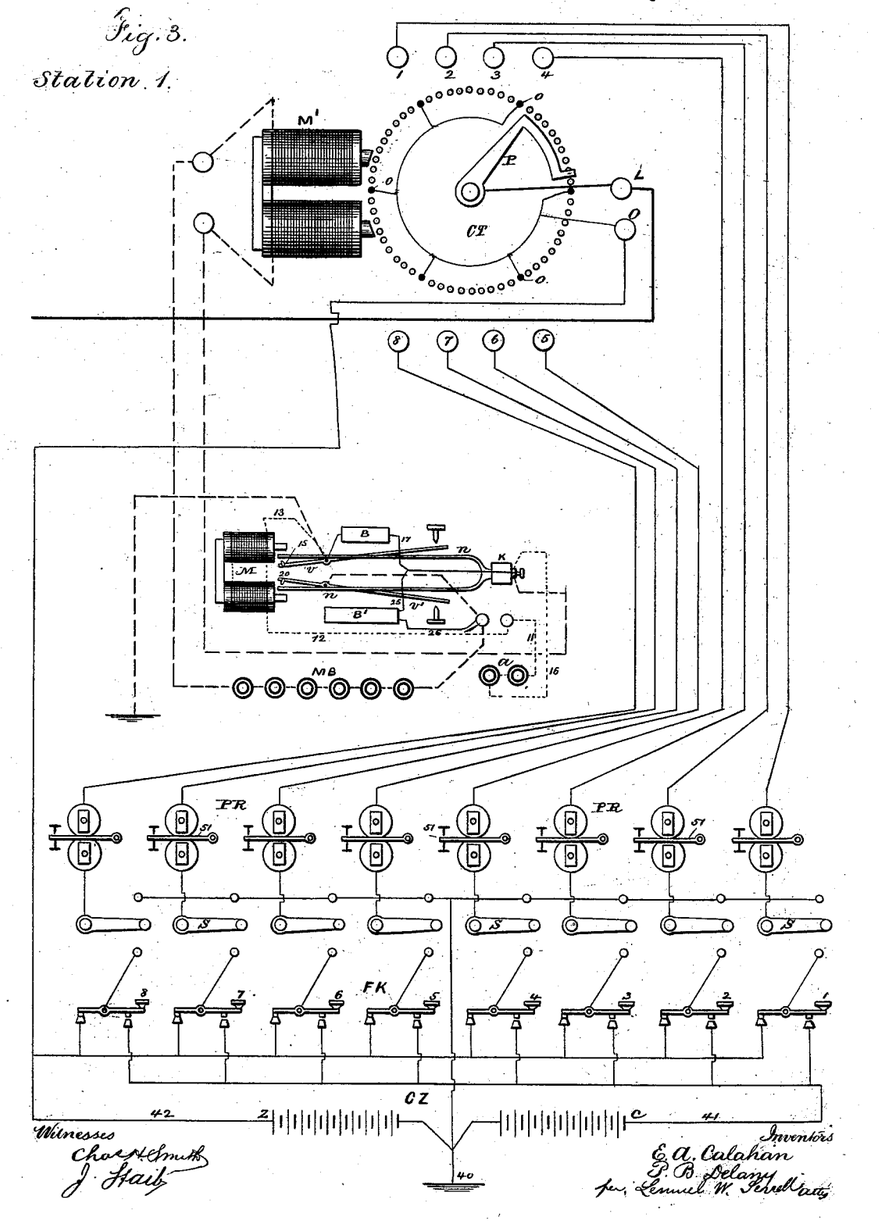
Figs. 3 and 4 represent the same transmitting and receiving instruments with two tuning-forks vibrating in unison, and, through their contact-points and local batteries, actuating the motor-magnets, and with a periodic connection over the one line-wire, so that the forks are kept synchronous in their movements.
Figure 4:
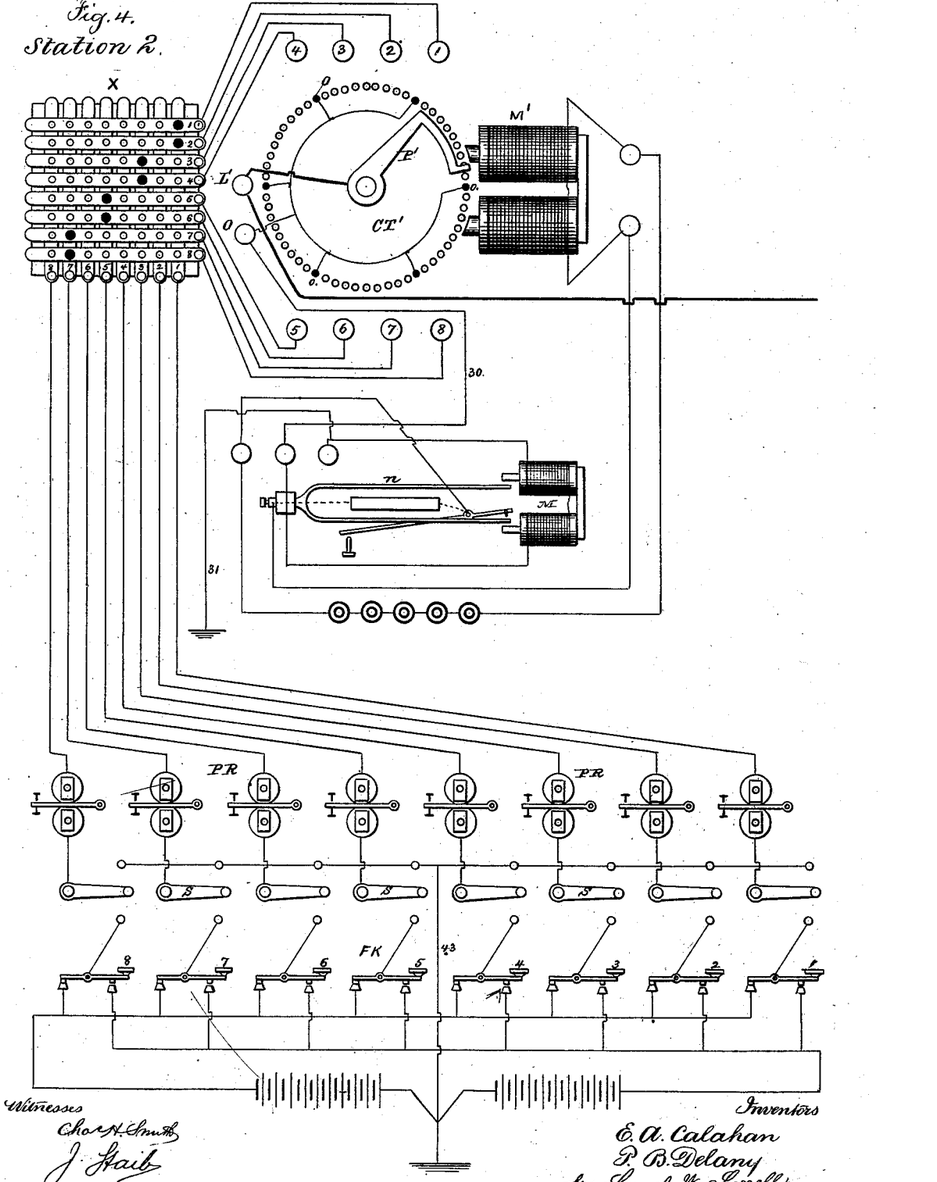

We will now describe a mode of pulsating the current to the motor-helices M', (shown in Figs. 3 and 4,) in which we only make use of one line-wire and use a portion of the contact-plates on the circuit-table for throwing through the helix M at station 2, Fig. 4, periodical currents sufficiently powerful to keep up the vibration of the tuning-fork, and for correcting any slight inaccuracy in the vibration of the fork at station 2. The magnet M at station 2, Fig. 4, is in the main line, and receives a certain proportion of the pulsations sent over the line in the manner next described, so that the vibrations of the tuning-fork $n$ will be kept up and be in perfect synchronism with those of the tuning-fork at the station No. 1, Fig. 3. Around each circuit-table C T and C T' there is a range of contact plates or blocks, with intervening insulating material, and the brushes of the progressive circuit-closers P and P' respectively travel over these contact-blocks. We now divide up each circuit-table into sections—say, for instance, six, (but the number might be more or less,)—and for convenience the contact-plates are numbered 1 to 8. There will be two extra plates for each section. On the drawings each of these contact-plates is made black and marked $o$, and the next plate is left vacant, thus making up equal to ten divisions in each section. We connect each of the contact-blocks *o* together and to the line *via* the binding-post O. This is done at both the stations No. 1 and No. 2. Every time the progressive circuit-closer P makes one revolution six of the equidistant pulsations sent over the line from station 1 to station 2, entering at L', will go through T' and *o* to O, thence by 30 to M, and 31 to earth. These pulsations, acting in M on the tuning-fork *n*, will cause it to vibrate in unison, for, although such fork may make nine vibrations without its power being re-enforced, still, in consequence of its tone, the rate of vibration of the tuning-fork will be perfect. Furthermore, in consequence of there being blank contact-plates between the contacts *o* and 1 on the circuit-table, there is an increased period of time for the line to be cleared and the tuning-fork to be corrected in its rate of vibration by the line-pulsation acting on M if there is the slightest error.

We have now described the isochronous or synchronous system employed by us for causing perfectly-uniform movements of the respective progressive circuit-closers P P' at the two ends of the line. We remark, however, that although these devices are adequate to the accomplishment of this end, our multiplex system of telegraphy, now to be described, is not limited to the means heretofore described for effecting the synchronous movements of the circuit-closers P P' at the respective stations, as any other competent means may be employed for rotating the two current-closers in perfect unison.

At each circuit-table we connect all the circuit-closing blocks marked 1 together and to the binding-post 1, all the blocks 2 to each other and to the post 2, and so on; hence we have eight binding-posts, numbered 1 to 8, and connections from them to all the corresponding plates in the respective groups.

We provide a range of eight finger-keys at F K, and number them 1 to 8. Each key is a three-point key. We use a suitable battery or generator, C Z, and separate the same into two sections. We connect the middle to earth at 40, the C end to the wire 41 and to all the front stops of the range of finger-keys F K, and we connect the Z of battery to the wire 42 and to all the back stops of the finger-keys F K.

To each key a switch, *s*, is provided. They are shown in a row on the drawings. Each switch serves to connect the incoming wire with the earth, or to connect the center of the key with the polarized relay. These polarized relays are shown in a row marked P R. There is one relay to each key.

Figure 5:
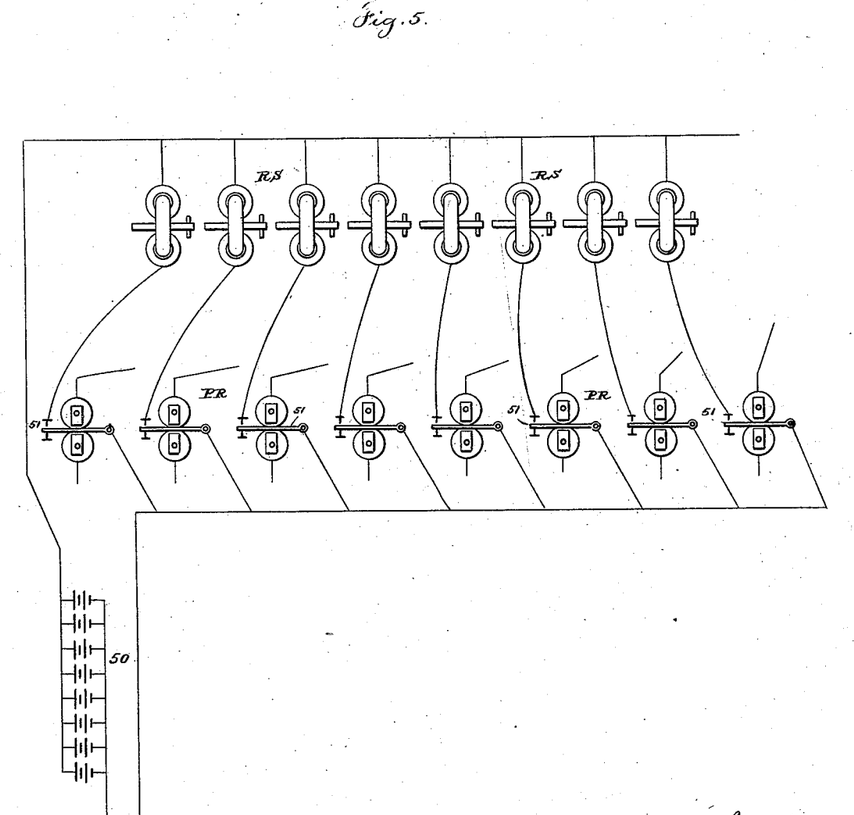
Fig. 5 represents the local sounders and connections to the polarized relays.

In the diagram Fig. 5 we have represented the mode in which these relays are conveniently connected up in circuit, so that each relay will have its appropriate sounder. In this diagram the sounders R S are in multiple arc from the battery 50, which is connected up for quantity, and the tongue 51 of each polarized relay closes the circuit to its sounder when the positive current passes through the helix of the relay, and opens the circuit to its sounder when the negative current passes.

The wire 42, Fig. 3, is connected to the binding-post O, so that it is always in position to furnish current to the line for regulating the movements of the distant tuning-fork, as before described.

At station No. 1 we have shown the respective polarized relays 1 2 3, &c., connected directly to the corresponding binding-posts around the circuit-table C T. This is done for greater clearness; but usually there will be a cross-bar switch-board, *x*, as shown at station 2, for connecting the wires by movable pins, as usual in telegraph-stations.

It will now be apparent that each pair of operators have a set of instruments to themselves, consisting of a key, switch, relay, sounder, and contact-blocks at each end of the line, and that pulsations can be sent from the back stop, putting Z to line, and the front stop, putting C to line. The current goes through the switch *s* and relay, and by the contact-block on C T and by P to line, and the operator, having the instruments of the same number at the distant station, connects his relay with ground 43 by the switch *s*. By following the numbers 1 to 8 on the respective parts it will be seen that there are, in fact, eight district terminal lines or branches, and that these lines end at the contact-blocks of the same number on the circuit-tables C T and C T'. Hence as the revolving progressive circuit-closers P P' travel around in perfect unison the main-line wire is transferred from one contact-block to the other with synchronous regularity, and with the devices shown by us this transfer is made six times to each terminal line in each revolution of the circuit-closers. When one operator manipulates his key—say No. 1—the receiver No. 1 at the other station gets the message independently, and no other instrument is influenced, and so it is in the manipulation of all the other instruments. The line is transferred in succession from one set of operators to another so quickly that there are no errors, and the polarized relays responding only to change of current, there is no humming of the armatures, and the local and sounders are distinct in their action.

By the switch-board shown in the circuit-connections at station No. 2, Fig. 4, the keys and relays can be connected to the binding-posts around the circuit-table C T', so as to employ one operator with each key, or to use a less number of operators than there are keys. In this latter case the pulsations or circuit-connections of the line will be apportioned among the respective operators.

As special claims are made in a separate application in relation to a two-wire system, we do not herein claim the same, broadly, but show its combination with the instruments herein described.

If desired, the line-wire and circuit, in which one or more forks are contained, may be employed, as aforesaid, to actuate numerous motor-magnets, so as to maintain synchronism in all the revolving circuit-closers driven by such motors, and there can then be separate transmitting-wires between the respective pairs of revolving circuit-closers with the keys, switches, and sounders to each, arranged as aforesaid.

Figure 8:
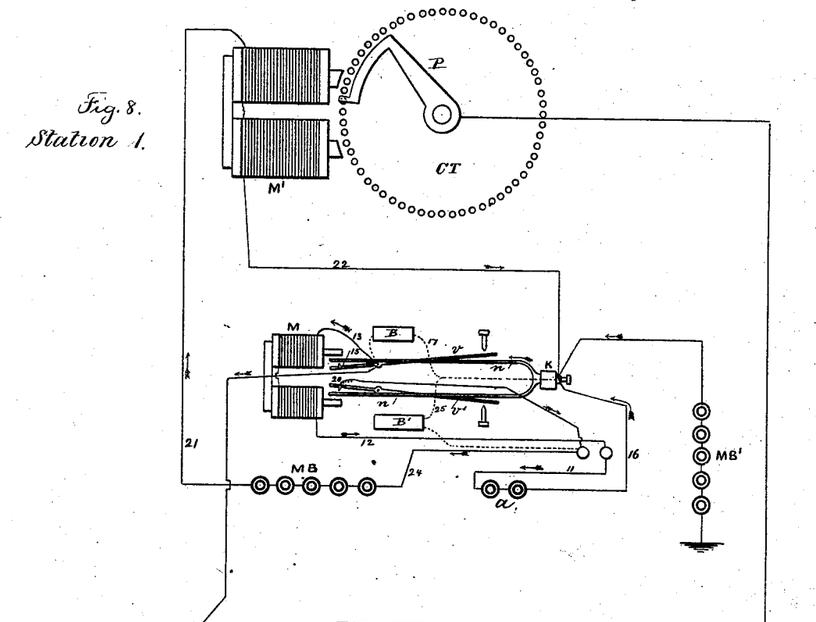
Figure 9:
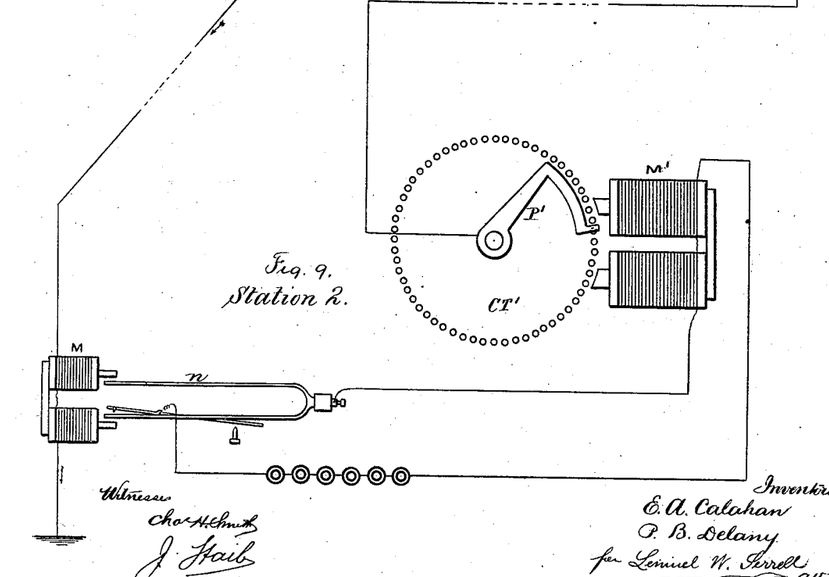

In Figs. 8 and 9 two terminal stations are shown, in which the connections from the fork at station 2, Fig. 9, are just the same as those in Fig. 7, before described, and at the station, Fig. 8, the current from local battery $a$ passes by 16 $k$ $n$ 15 13 12 11. This keeps the fork in vibration. The line-current is also pulsated at point 15, the current passing from battery M B, by K $n$ 15 line, to distanct helix M, and thence to earth. The motor at each end is driven by a local circuit and battery pulsated at the insulated point 20, and passing from 24, by 20 $n$ $k$ 22, to M′, and back, by 21, to battery M B.

We claim as our invention—

1. In a multiplex telegraph, the combination, with a line and a revolving circuit-closing device at each end of the line, and means for revolving the same synchronously, of circuit-reversing keys, polarized relays and battery, and ground-connections, substantially as specified, whereby the messages transmitted by the reversals of currents are received on the polarized relays and sounders without being mutilated by the action of the revolving circuit-closers that apply the line successively to the respective transmitting and receiving instruments, as set forth.

2. The combination, in a multiplex-telegraph system, of two or more groups of instruments at each end, each group consisting of a circuit-reversing key, a switch, a polarized relay and a sounder, circuit-connections from batteries through each group to circuit-closing blocks, and a revolving progressive circuit-closer at each end of the line, and means for moving such circuit-closers with perfect uniformity, substantially as set forth.

3. In a multiplex-telegraph system, a series of keys, a divided battery, and circuit-connections to the battery, substantially as set forth, for sending reverse currents, in combination with polarized relays and switches in the circuits between the keys and line-connections, and a progressive circuit-closer at each end of the line, and means for revolving the same synchronously, substantially as set forth.

4. The combination, in a multiplex telegraph, of one or more vibrating forks and two revolving circuit-closing-instruments, two line-wires and batteries, one of which is employed for the pulsations which insure synchronism in the revolving instruments and the other for the pulsations between the transmitting and receiving devices of the multiplex telegraphic instruments, substantially as set forth.

Signed by us this 6th day of November, A. D. 1882.

EDWD. A. CALAHAN.
PATRICK B. DELANY.

Witnesses:
GEO. T. PINCKNEY,
WILLIAM G. MOTT.